(12) United States Patent
Ivett (10) Patent No.: US 9,371,945 B2
(45) Date of Patent: Jun. 21, 2016

(54) CORRUGATED TUBE CONNECTOR (76) Inventor: Jonathon Lachlan Ivett, London (GB)

(*) Notice: Subject to any disclaimer, the term of this patent is extended or adjusted under 35 U.S.C. 154(b) by 106 days.

(21) Appl. No.: 13/878,595

(22) PCT Filed: Oct. 11, 2011

(86) PCT No.: PCT/GB2011/001465
§ 371 (c)(1),
(2), (4) Date: Jul. 17, 2013

(87) PCT Pub. No.: WO2012/049452
PCT Pub. Date: Apr. 19, 2012

(65) Prior Publication Data
US 2013/0300110 A1  Nov. 14, 2013

(30) Foreign Application Priority Data
Oct. 11, 2010 (GB) .................................. 1017131.2

(51) Int. Cl.
F16L 25/00 (2006.01)
F16L 19/02 (2006.01)

(52) U.S. Cl.
CPC ............. F16L 19/02 (2013.01); F16L 25/0036 (2013.01); F16L 25/0054 (2013.01)

(58) Field of Classification Search
USPC .............. 285/248, 234, 334.5, 249, 354, 389, 285/903, 322
See application file for complete search history.

(56) References Cited

U.S. PATENT DOCUMENTS

| 4,437,691 | A  | * | 3/1984 | Laney ........................ 285/353 |
| 4,674,775 | A  | * | 6/1987 | Tajima et al. ............... 285/330 |
| 4,907,830 | A  |   | 3/1990 | Sasa et al. |
| 6,099,046 | A  | * | 8/2000 | Oh ............................. 285/354 |
| 6,173,995 | B1 | * | 1/2001 | Mau .............................. 285/55 |
| 7,690,695 | B2 | * | 4/2010 | Duquette et al. ............. 285/322 |
| 2005/0023832 | A1 | * | 2/2005 | Edler ........................ 285/354 |
| 2010/0209178 | A1 |   | 8/2010 | Oh |
| 2013/0049359 | A1 | * | 2/2013 | Choi ......................... 285/334.5 |

FOREIGN PATENT DOCUMENTS

JP       60 047986 U    4/1985

OTHER PUBLICATIONS

Search Report dated Jan. 20, 2011 for GB1017131.2.
International Search Report dated Jun. 3, 2012 for PCT/GB2011/001465.

* cited by examiner

Primary Examiner — Aaron Dunwoody
(74) Attorney, Agent, or Firm — Charles N. Quinn; Fox Rothschild LLP

(57) ABSTRACT

A connector for a length of corrugated tubing. The connector includes a fitting including a passage therethrough, a clamping surface, a seal, and a nut operably connected to the fitting. The tubing is in fluid communication with the passage through the fitting. Axial movement of the nut towards the clamping surface-urges the tubing against the seal wherein the tubing is thereby sealingly restrained to the fitting and a clamping surface is formed capable of causing an end portion of the corrugated tube to form a flare by the end portion of the corrugated tube being compressed against the clamping surface and the seal and sealed thereagainst by the action of the nut.

17 Claims, 7 Drawing Sheets (a)

CORRUGATED TUBE CONNECTOR

BACKGROUND OF THE INVENTION

The present invention relates to a connector for use with corrugated tubing, and more specifically but not exclusively, to a connector including an O-ring for sealing corrugated tubing to said connector.

Corrugated tubing is widely used as a conduit in the gas industry and it is a common requirement that such tubing is easily and hermetically attachable to a multitude of devices. As a result, many different forms of hermetically sealable connectors for use specifically with corrugated tubing exist, the desirable characteristics of which include ease of manufacture and assembly, and durability and maintainability of the seal during use.

An example of a connector for corrugated tubing is disclosed in EP 0 853 742 B1 which describes a fitting including a locating sleeve. The fitting is installed by cutting the tubing in a valley in the surface of the tubing and placing a nut over the tubing. Two split ring washers are placed in a valley adjacent to the cut end of the tubing to restrict movement of the nut. The body is aligned with the tubing by placing the locating sleeve connected to the body in the tubing. The nut engages threads on the body and as the nut is tightened, a tapered end of the body engages the cut end of the tubing and flares the cut end of the tubing. The fitting makes a flared metal-to-metal seal by folding the convolutions of the tubing back against itself creating a double flare without the need for flaring or flattening tools. In the context of this technical field, the term flaring and derivatives thereof refers to the action of an end of a corrugated tube being urged against a clamping face, said face tapering radially outward and in a direction forward of said tubing such that at least one tubing corrugation collapses axially and said tube end is urged and then subsequently clamped interiorly of said tube.

A further example of prior art in this field is U.S. Pat. No. 4,674,775 which describes a coupling for a corrugated conduit including a main tubular body with a sleeve defining a conduit receiving bore terminating at its inner end in an annular shoulder projecting radially inwardly of the tubular body. A nipple clamps the end portion of the conduit and, upon rotation of a nut, said nipple is pressed forwardly forcing the conduit into the shoulder at which point corrugations left projecting beyond the nipple are collapsed between the forward end of the nipple and the shoulder. At the juncture of the shoulder and the conduit is an annular groove receiving a sealing ring for improving the sealing effect between the shoulder and the conduit end.

A disadvantage of EP 0 853 742 B1 lies in the reliance on the integrity and durability of just a flared metal-to-metal seal. A disadvantage of U.S. Pat. No. 4,674,775 lies in the reliance on the sealing qualities of a non-flared metal-to-metal seal.

BRIEF SUMMARY OF THE INVENTION

According to a first embodiment of the present invention, there is provided a connector assembly for a length of corrugated tubing, the connector assembly comprising:
a fitting including a passage;
a clamping surface;
a seal;
and an axial loading means operably connected to the fitting,
wherein, in use, a corrugated tube is in fluid communication with said passage of said fitting and wherein axial movement of said loading means towards said clamping surface urges said tubing against said clamping surface and against said seal wherein said tubing is thereby sealingly restrained to said connector fitting; and
wherein the clamping surface is formed such that, in use, it is capable of causing an end portion of a corrugated tube to form a flare by said end portion being compressed against said clamping surface and against said seal and sealed thereagainst under the action of the loading means.

Up until now it has been thought enough to rely on either a double flare as the mechanism by which connectors of this type are sealed or no double flare but the collapsing of tubing corrugations combined with an annular sealing means such as an elastomeric O-ring or gasket. A connector assembly in accordance with the invention has the advantage that the strength and durability of a double flare connection between a tube and a connector is greatly enhanced when allied with the sealing qualities of a seal. Furthermore, the provision of two effective sealing means (the double flare connection and the seal) has the advantage that the connector of the present invention is not as reliant as the prior art on high quality manufactured parts with minimal surface imperfections in order to form an effective seal, thus making the connector of the present invention quick and cheap to manufacture.

In addition to this, known double flare connectors rely on the creation of said double flare in order to achieve a seal. The creation of the flare, though, is reliant on a user cutting a corrugated tube in the correct position and inserting a loading means around said tube correctly so as to leave a convolution of said corrugated tube free to be compressed when said tubing is connected to the fitting. The provision of the seal, for example in the form of an O-ring, in the connector of the present invention enables a substantially hermetic seal to be created even when a flare is not formed within the connector, for example, due to incorrect positioning of the loading means, incorrect cutting of the tubing, or a failure in the material of the corrugated tube. The connector of the present invention is not as reliant on the user in order to function.

Furthermore, the fitting can be inexpensively maintained by regularly replacing said seal before it is considered overly worn.

As disclosed in the introduction, the term 'to flare' and any derivative thereof refers to the action of an end of a corrugated tube being urged against a clamping face, said face tapering radially outward and in a direction forward of said tubing such that at least one tubing corrugation collapses axially and said tube end is urged and then subsequently clamped interiorly of said tube. The folded portion of said corrugated tubing is referred to as a flare.

Flaring can also refer to the collapsed, concertina-like folding of more than one convolution of corrugated tubing against a tapered clamping face to form multiple folded portions. The strength and durability of the connection between the tube and the connector is, therefore, further enhanced by also including the sealing qualities of a flared metal-to-metal connection. A hermetic seal can be achieved by using both a flared metal-to-metal connection in conjunction with a compressed seal. Preferably, the seal is an O-ring and, further preferably, is made from resilient material which may be an elastomeric material. The seal may be annular and have any suitable cross section, for example circular, square, rectangular and/or be grooved or ribbed.

The axial loading means, preferably, comprises a collet which, in use, engages at least one convolution of a corrugated tube. The collet is an element which may be shaped to surround the corrugated tubing and to engage with the corrugations such that one element moves with the other. Preferably, the axial loading means further comprises a nut, advantageously said nut engages the collet such that movement of a corrugated tube relative to the loading means is restricted by the position of the nut. Axial movement of the loading means towards the clamping surface preferably urges a corrugated tube towards said clamping surface.

Before assembly, the tubing may advantageously be cut in a valley in the corrugated surface. The clamping surface preferably opposes an end face of the loading means and, in use, said end face matingly engages with said clamping surface. Advantageously, said end face and said clamping surface may define an oblique angle in relation to the axial movement direction of said loading means. As such, a folded surface of the corrugated tube end can be brought flush into contact with the clamping surface and can be compressed evenly between said surface and the end face of the collet so as to be securely restrained therebetween and to create a sealing engagement with the opposing clamping surfaces.

Preferably, an annular collar with a frusto-conical surface which tapers radially outward forms the clamping surface. Advantageously, said clamping surface forms a shoulder against which, in use, a corrugated tube abuts. This prevents a corrugated tube from travelling internally through said passage. Accordingly, a tube is, in use, compressed against the shoulder to flare against the clamping surface when the loading means is advanced towards the fitting. Preferably, the diameter of the leading edge of the frusto-conical surface is smaller than the internal diameter of the tubing such that the tubing is thereby prevented from being urged past and internally through the passage.

Preferably, the seal is closely pressfittingly received by the fitting and is secured in place by virtue of its close tolerance fit therewith.

Advantageously, the seal is positioned exteriorly of the fitting passageway, i.e. the seal is not positioned interiorly in the fitting passageway and no part of it protrudes into the fitting passageway, thus maximising the diameter of the fitting passageway.

In one embodiment of the invention, the seal may comprise a frusto-conical surface which tapers radially outwardly so as to engage with the clamping surface by virtue of its congruent shape. The connector may further comprise an end face which extends radially outwardly from the clamping surface and the seal may comprise a rim which extends radially outwardly so as to engage with said end face. Preferably, the seal is sized so as to, in use, engage with substantially all the clamping surface and end face such that there are no voids or gaps, thus enabling a hermetic seal between the fitting and the tube. The seal is, preferably, made of a malleable material such as copper.

In another embodiment of the invention, a recess such as an annular groove or the like may press-fittingly receive the seal. Advantageously, the recess is sized and configured to contain the seal when, in use, it is compressed by the loading means. Advantageously, the seal does not protrude from the recess when the connector is fully tightened. This allows a surface of a corrugated tube end to contact the clamping surface without any voids or gaps, thus enabling a hermetic seal. Furthermore, the seal may be press-fittingly received by the recess. Such a friction tight fit prevents the seal from falling out of the connector prior to assembly with a corrugated tube. The seal may also be easily replaced when worn, thus greatly improving the life of the connector assembly and making said assembly cheaper to maintain.

Preferably, the seal has a diameter substantially equal to the exterior diameter of a corrugated tube at the apex of a corrugation.

The collet, advantageously, includes at least one bevelled ridge capable of matingly engaging with at least one corrugation of a corrugated tube. The at least one bevelled ridge preferably opposes the clamping surface of the fitting. Advantageously, the collet comprises two or three or more bevelled ridges. Engagement of the collet with the tubing may be such that there is a close tolerance fit.

Each bevelled ridge may have a pitch and profile substantially equal to the pitch and profile of the corrugations of a corrugated tube. This enables the collet to mate securely with a corrugated tube such that said tubing cannot move significantly in relation to the collet. The proximal and distal end faces of the collet, preferably, have the same profile such that the collet can be oriented with either of its ends proximate to the clamping surface of the fitting.

Advantageously, the collet and nut that comprise the axial loading means are two separate parts, but it will be understood that they could, for ease of assembly, be formed as one part. The nut is preferably a flanged nut and, further advantageously, the collet is formed of two semi-circular rings, thus enabling it to be secured in position around either side of the corrugated tubing.

In a further embodiment of the invention the proximal and distal end faces of the collet are perpendicular to the longitudinal axis of the fitting. In another embodiment of the present invention the collet includes a shoulder for, in use, engaging with the nut. Preferably, a first shoulder is located at the proximal end and a second shoulder is located at the distal end of the collet enabling said collet to be reversible such that it can be placed on the tubing either way round. This ensures that provision of a shoulder on the collet does not complicate the installation of the connector assembly. The shoulder is, preferably, in the form of an L-shaped cut out in the end faces of the collet. In use, the shoulder proximate to the clamping surface of the fitting may provide a void in the fitting into which the tube can extend when flaring. This reduces any bunching of corrugated tube within the fitting, thus enabling the collet to press evenly over the surface of said tubing which improves the integrity of the seal between a corrugated tube, the collet and the connector.

According to a further aspect of the invention, there is provided a method for securing a connector assembly to a corrugated tube, comprising the steps of:

a) providing a connector assembly and a corrugated tube, the connector assembly comprising a fitting including a passage, a clamping surface, a seal, and an axial loading means, b) cutting said corrugated tube in a valley in the corrugated surface to form a cut end, c) placing said axial loading means over said tubing, d) engaging said cut end of the tubing with said clamping surface, e) operably connecting said axial loading means to said fitting, f) applying a load to said axial loading means such that said corrugated tube is driven into contact with said clamping surface and said cut end is urged axially to create a flare which is compressed against said clamping surface and against said seal such that said corrugated tube is thereby sealingly restrained to said fitting.

According to another aspect of the invention, there is provided a method for securing a connector assembly to a corrugated tube, comprising the steps of:

a) providing a corrugated tube and a connector according to the present invention, b) cutting said corrugated tube in a valley in the corrugated surface to form a cut end, c) placing said axial loading means over said corrugated tubing, d) engaging the cut end of the tubing with said clamping surface, e) operably connecting said axial loading means to said fitting, f) applying a load to said axial loading means such that said corrugated tube is driven into contact with said clamping surface and said cut end is urged axially to create a flare which is compressed against said clamping surface and against said seal such that said corrugated tube is thereby sealingly restrained to said fitting.

Preferably, the method for securing a connector assembly to a corrugated tube further includes the step of placing a collet in the first complete valley adjacent to the cut end of the tubing and, further advantageously, engaging the collet with the axial loading means.

It will be apparent to those skilled in the art that the connector assembly of the present invention could be attached to metal or plastic corrugated tubing or other types of tubing. The connector assembly may, for example, be used with stainless steel corrugated tubing or with more ductile metal tubing such as copper tubing. The tubing could be made from any suitable material and could have ridges or other such engageable means only at the cut end rather than corrugations along the length of the tubing.

BRIEF DESCRIPTION OF THE DRAWINGS

In order that the invention may be more readily understood, reference will now be made, by way of example, to FIGS. 1 to 6, in which.

DETAILED DESCRIPTION OF THE INVENTION

Figure 1:
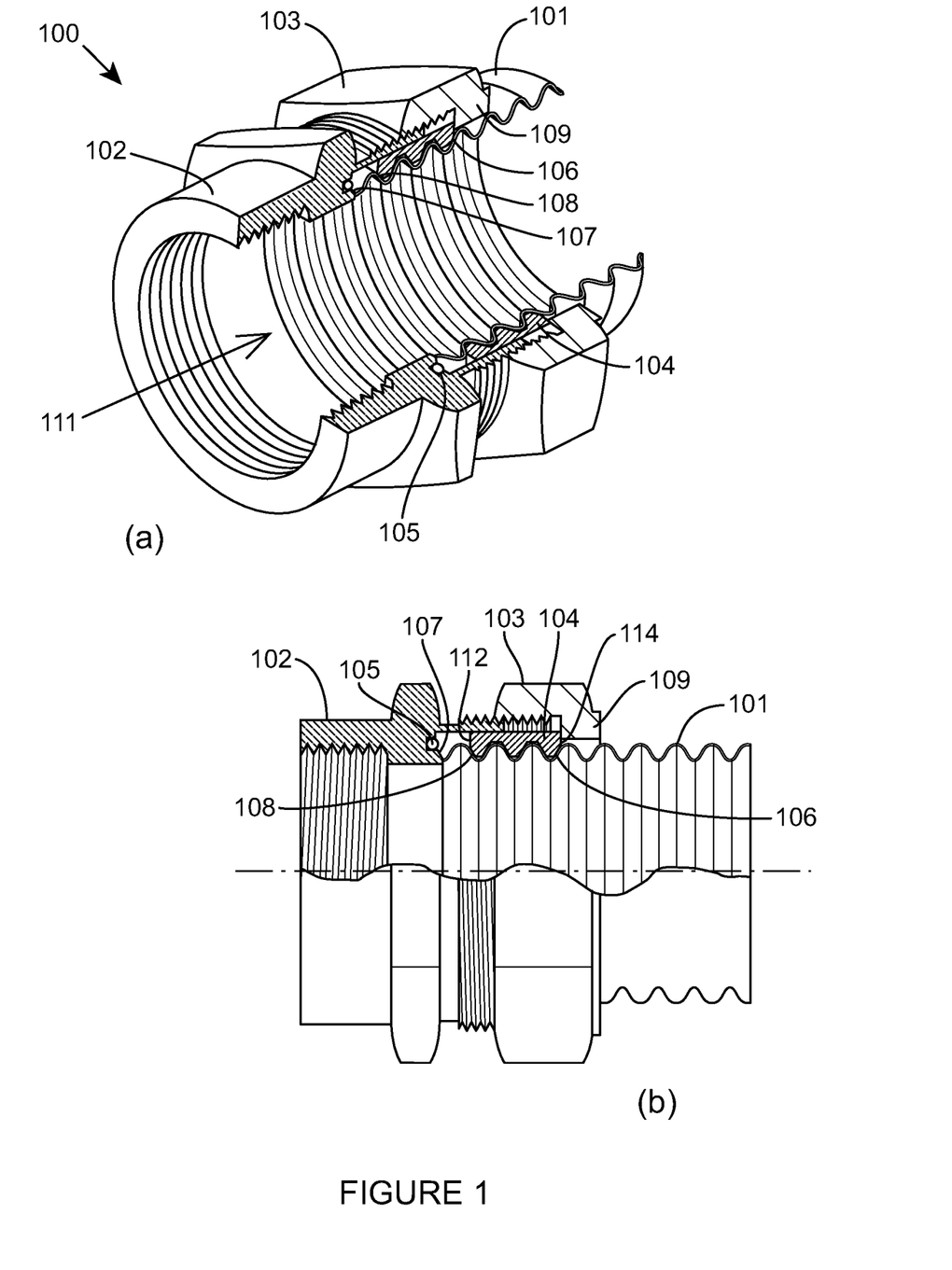
FIG. 1(a) is a perspective, partial cut-away view of a connector assembly according to a first embodiment of the present invention showing a nut in a first position.
FIG. 1(b) is a plan, partial cut-away view of the connector assembly of FIG. 1(a)
Figure 2:
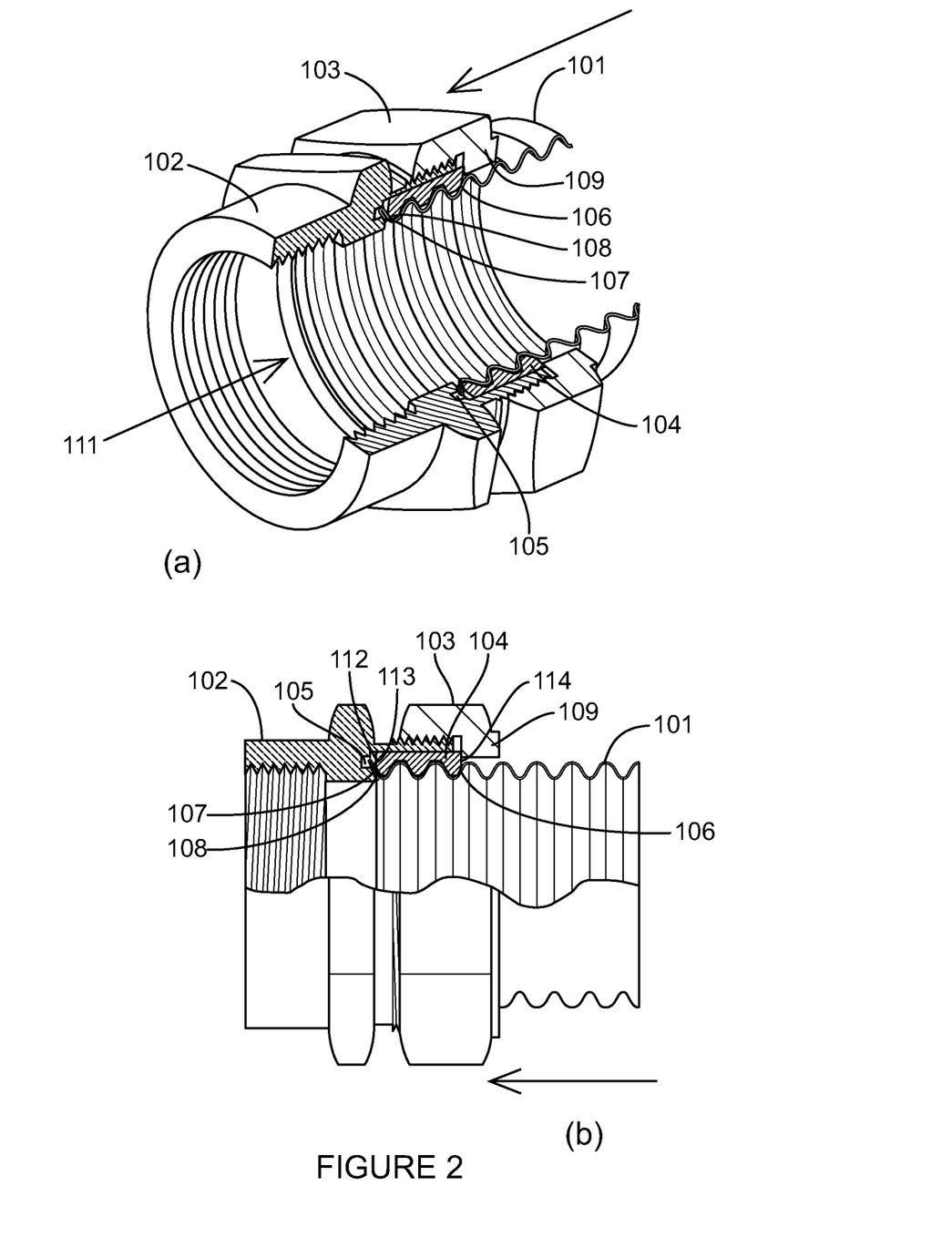
FIG. 2(a) is a perspective, partial cut-away view of the connector assembly according to a first embodiment of the present invention showing the nut in a second position.
FIG. 2(b) is a plan, partial cut-away view of the connector assembly of FIG. 2(a)
Figure 3:
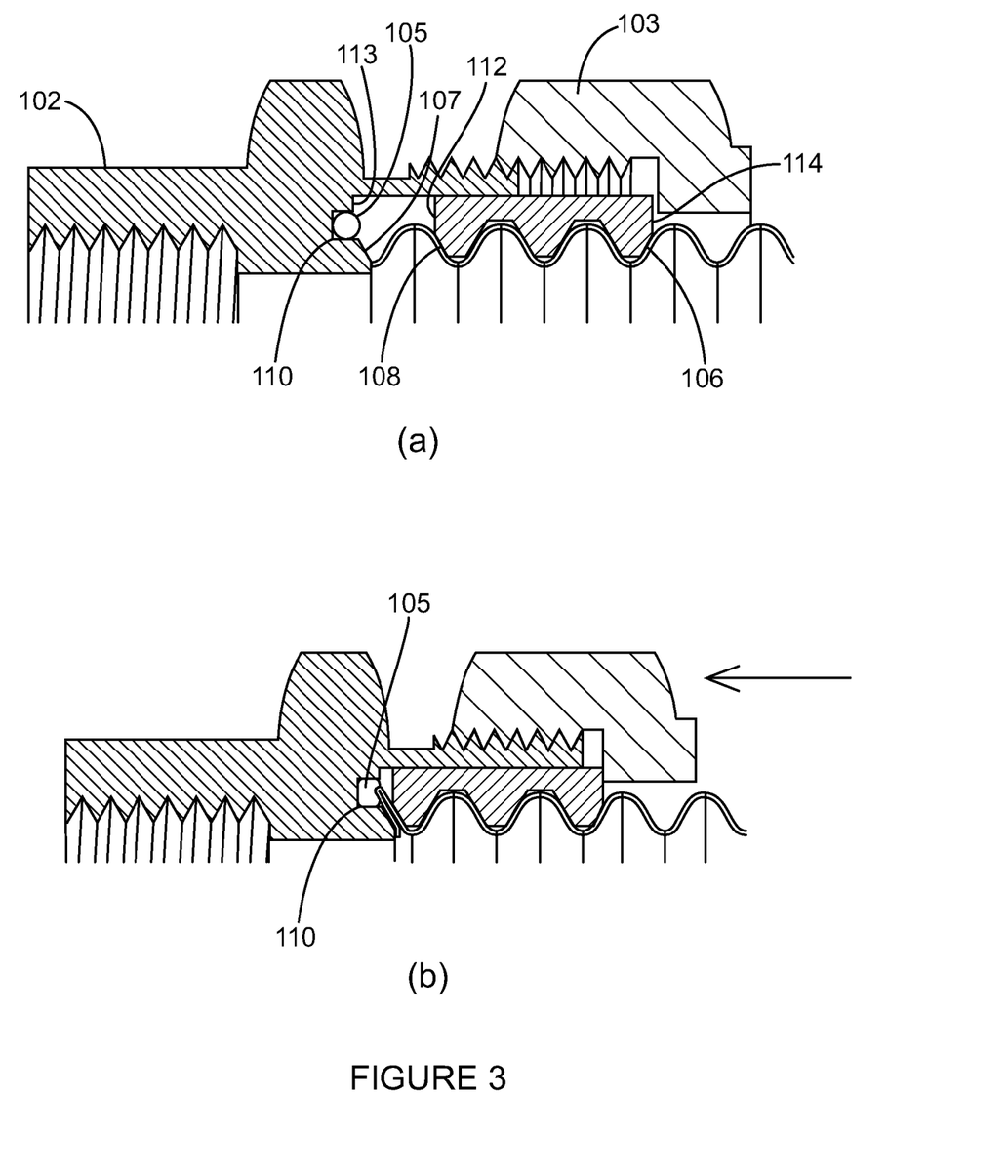
FIG. 3(a) is an enlarged view of a portion of FIG. 1(b)
FIG. 3(b) is an enlarged view of a portion of FIG. 2(b)

A first embodiment of the invention will now be described with reference to FIGS. 1 to 3. Referring firstly to FIGS. 1(a) and 1(b), a predominantly cylindrical connector assembly 100 is shown which, in use, is connected at one end to a corrugated stainless steel tube 101 and at the other end to an apparatus (not shown). The connection between the tubing and the connector is substantially hermetic and will be described in more detail below.

References to the tubing 101 are references to the connector assembly 100 when in use.

The connector assembly 100 comprises a fitting 102, an axial loading nut 103, a collet 104, a seal in the form of an elastomeric 0-ring 105 and a clamping surface 107. As used herein, the term "proximal" refers to a point, location, end or the like which, in use, is closest to the clamping surface 107. The term "distal" refers to a point, location, end or the like which, in use, is furthest from the clamping surface 107. The fitting 102 is cannular, with a through passage 111, a proximal portion of which forms a tubing aperture having an internal diameter, at the proximal end, approximately equal to the exterior diameter of the corrugated tubing 101 and with a threaded exterior; the distal end of the fitting 102 having a threaded interior.

Together, the nut 103 and the collet 104 form a loading means.

In preparation for attachment of the connector assembly 100 to the tubing 101, the tubing 101 is cut in a valley in the corrugated surface. Following this, in use, the tubing 101 is received by the fitting 102 to form a single conduit with the passage by urging the fitting 102 over and around the cut end of the corrugated tubing 101. The tubing 101 and fitting 102 are then retained together by provision of the nut 103 and collet 104 wherein the collet 104 is positioned in a valley on the outer surface of the corrugated tubing 101 and the nut 103 engages both a distal face 106 of said collet 104 and the threaded exterior of the fitting 102. Each component of the assembly 100 is described in greater detail below.

The method for connecting the connector assembly 100 to the tubing 101 is as follows:

The tubing 101 is cut, for example using a pipe cutter, in a valley in the corrugated surface of the tubing 101. The nut 103 is then placed over the tubing 101 and the collet 104 is placed in the first complete valley adjacent to the cut end. The tubing 101 is then received in the proximal end of the fitting 102 so as to be in fluid communication with the passage 111 through the fitting 102 and the nut 103 is tightened onto the threaded exterior of said fitting 102.

As the nut 103 is tightened said nut 103 engages with the distal face 106 of the collet 104. Further axial movement of the nut 103 towards the fitting 102 urges the collet 104 and, in turn, the tubing 101, towards the clamping surface 107 located on the interior walls of the fitting 102. The clamping surface 107 tapers radially outward and is configured such that continued tightening of the nut 103 urges the cut end of the tubing 101 to collapse axially such that the cut end of the tubing folds concertina-like against an adjacent convolution of corrugated tubing 101 to form a folded portion as it is driven against the clamping surface 107 of the fitting 102. The tube end is subsequently positioned interiorly of said tube thus creating a compressed corrugation referred to in the art as a double-walled flare. The flare is brought into engagement with the 0-ring 105 positioned on the clamping surface 107 of the fitting 102 as the nut 103 is tightened to its fullest extent. A hermetic seal is formed as the flare is compressed against the clamping surface 107 and 0-ring 105 by a proximal face 108 of the collet 104 which opposes the clamping surface 107. The combination of the flared metal-to-metal connection allied with the 0-ring 105 creates a seal which is more reliable and durable than joins achieved by known corrugated tube connectors. FIGS. 2(a) and 2(b) show the connector assembly 100 fastened to the corrugated tubing 101.

It will be apparent that the position of the collet 104 determines whether the flare is double-walled. If the collet 104 is placed in the first complete valley of the corrugated tubing adjacent to the cut end then a double-walled flare can be created. If the collet is placed in a corrugation or corrugations forward of this point, i.e. in the direction of the fitting, then no folding of the corrugations can be achieved. If the collet is placed in a corrugation or corrugations away from this point, i.e. further from the fitting, then, in use, more than one corrugation may be collapsed.

FIGS. 3(a) and (b) are enlarged views of the connector assembly 100 and show the folding and compression of the cut end of the tubing 101 against the clamping surface 107 and O-ring 105 to create the flare, described above in detail. The collet 104 is of the form of two semi-circular rings with a first and second half fitting around and on either side of the tubing 101. The collet 104 includes three radially interiorly facing bevelled ridges; one forming the distal face 106 at one end, one forming the proximal face 108 at the opposite end and one positioned therebetween. In use, the proximal face 108 co-ordinates with the clamping surface 107 to provide opposing surfaces between which the corrugated tube 101 is compressed. Each bevelled ridge is sized and positioned so as to be received into adjacent corrugations of the tubing 101.

A flat end face 112 extends radially outward from the proximal face 108 and perpendicular to the longitudinal axis of the fitting 102. This end face 112 opposes a fitting end face 113 which extends radially outward from the clamping surface 107 and also perpendicular to the longitudinal axis of the fitting 102. An annular recess 110 for press-fittingly receiving the O-ring 105 is located in the fitting end face 113. A second end face 114 extends radially outward from the distal face 106 and perpendicular to the longitudinal axis of the fitting 102 such that the collet 104 can be used with either the first or second end face 112, 114 proximate to the clamping surface 107.

The nut 103 is of the form of a locking nut with a flange 109 at the distal end and an interiorly threaded portion at the proximal end. The flange 109 has a smaller internal diameter than the internal diameter of the threaded portion of the nut 103 and approximately equal to the exterior diameter of the tubing 101 at the apex of a corrugation.

The second end face 114 extending from the distal face 106 of the collet 104 engages the flange 109 such that when the nut 103 is tightened (i.e. the nut is rotated, causing it to move proximally) said flange 109 is driven into abutment with the collet 104 thus preventing distal movement of said collet 104 and, in turn, the corrugated tubing 101, and urging said collet 104 and tubing 101 proximally, towards the clamping surface 107 of the connector fitting 102. A similar profile on the proximal end of the collet 104 means the collet 104 is reversible. This enables it to be placed on the tubing either way round, therefore simplifying installation of the connector assembly 100.

The profile of the clamping surface 107 of the first embodiment can be seen most clearly in FIGS. 3(a) and 3(b). The clamping surface 107 defines a frusto-conical surface which tapers radially outwardly in a direction toward the distal end of the fitting 102. The face of the clamping surface 107 opposes and may abut the proximal face 108 of the collet 104 and tapers so as to matingly engage with said face 108. The clamping surface 107 adjoins an annular collar portion which is raised in relation to the clamping surface in a direction extending radially into the passage 111. This annular collar has a smaller diameter than the diameter of the tubing 101 at the cut end. It, therefore, forms a shoulder in the passage 111 against which the inserted tubing 101 abuts. In use, the tubing 101 is prevented from travelling past so is compressed against the clamping surface 107 when the nut 103 is tightened. The shoulder against which the tubing 101 abuts extends radially perpendicularly to the wall of the passage 111.

FIGS. 3(a) and 3(b) also best show the exterior profile of the bevelled ridges of the collet 104. Each bevel has a pitch and profile which closely matches the pitch and profile of the tubing corrugations and is sized such that each bevel can receiveably locate in a trough of a corrugation and is closely press-fittingly received therein thus limiting the axial movement of said tubing 101.

The 0-ring 105 has a diameter approximately equal to the exterior diameter of the tubing 101 at the apex of a corrugation and is press-fittingly secured in the recess 110 in the fitting end face 113. The 0-ring 105 remains in place when the corrugated tubing 101 is not pressed thereagainst but is also removable such that it can be replaced when worn. The recess 110 is sized so as to contain the 0-ring 105 when, in use, it is under compression from the folded tubing 101. As such, in use, the 0-ring does not force the surface of the folded tubing 101 apart from the clamping surface 107 but is compressed to fill any voids therebetween. The 0-ring 105 is of the form of a toroid with circular cross section. Also, the collet 104 is sized such that when, in use, the nut 103 is tightened to its fullest extent and the flared corrugated tubing 101 is clamped between the proximal face 108 of said collet 104 and the clamping surface 107 the proximal end face 112 and opposing fitting end face 113 are spaced apart. This spacing provides a void in the fitting 102 into which the tube 101 can extend when flaring. This reduces any bunching of the tubing 101 within the connector fitting 102 and enables the collet 104 to press evenly over the surface of the folded portion of the corrugated tubing 101 and against the clamping surface 107 which improves the integrity of the seal therebetween.

Figure 4:
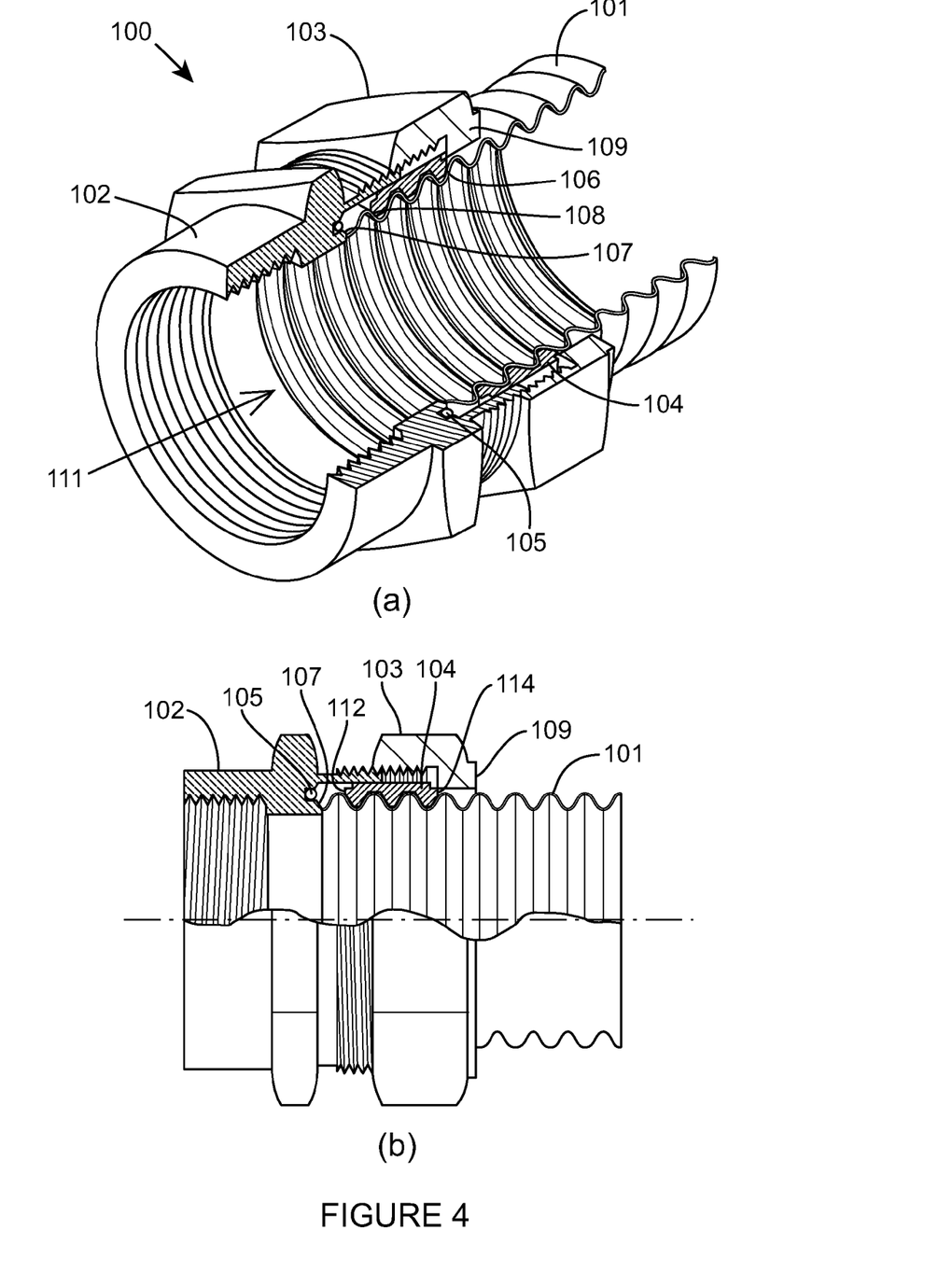
FIG. 4(a) is a detailed view of a portion of the connector assembly according to a second embodiment of the present invention showing the nut in a first position.
FIG. 4(b) is a detailed view of a portion of the connector assembly according to a second embodiment of the present invention showing the nut in a second position.
Figure 5:
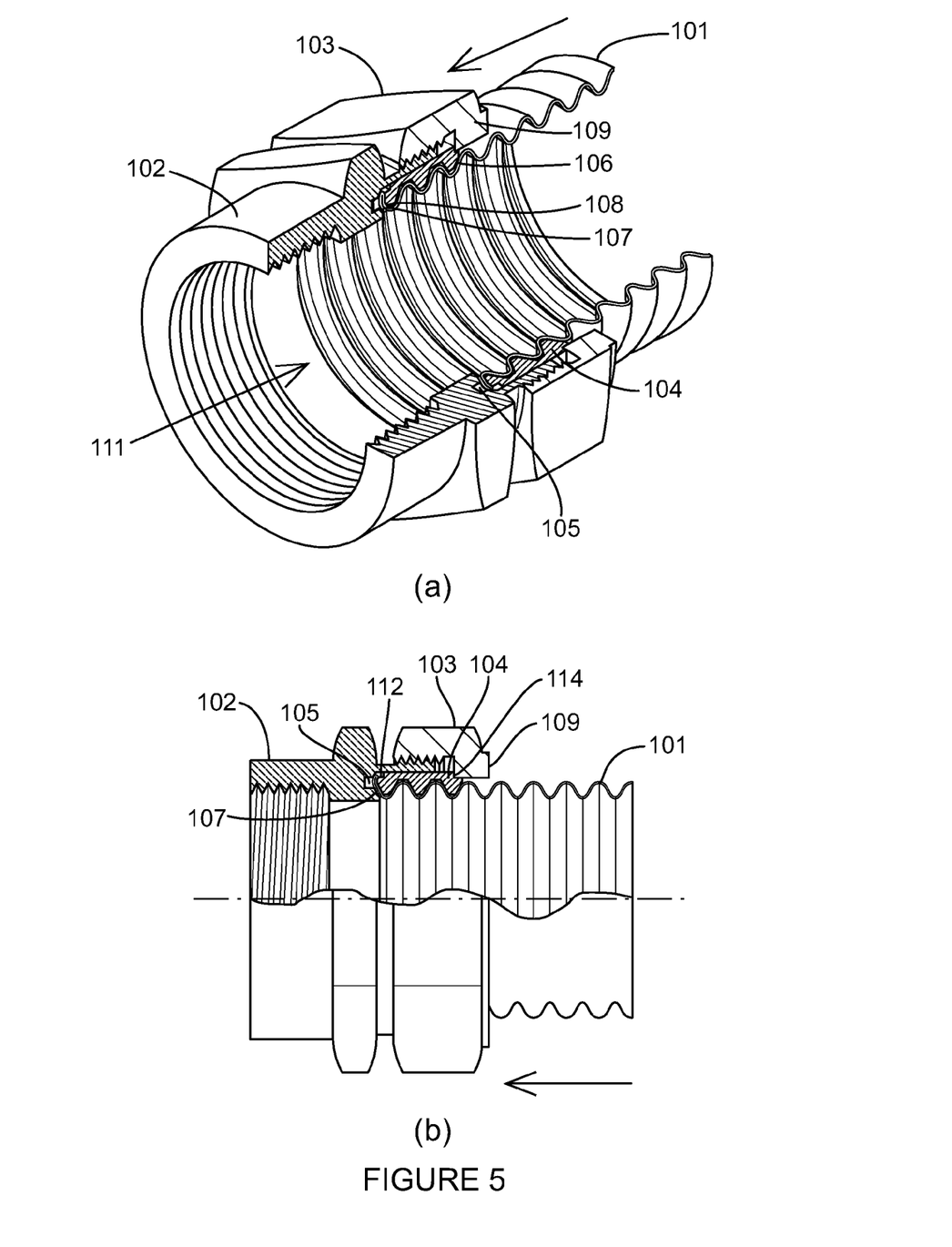
FIG. 5(a) is a perspective, partial cut-away view of the connector assembly according to a second embodiment of the present invention showing the nut in a second position.
FIG. 5(b) is a plan, partial cut-away view of the connector assembly of FIG. 5(a)
Figure 6:
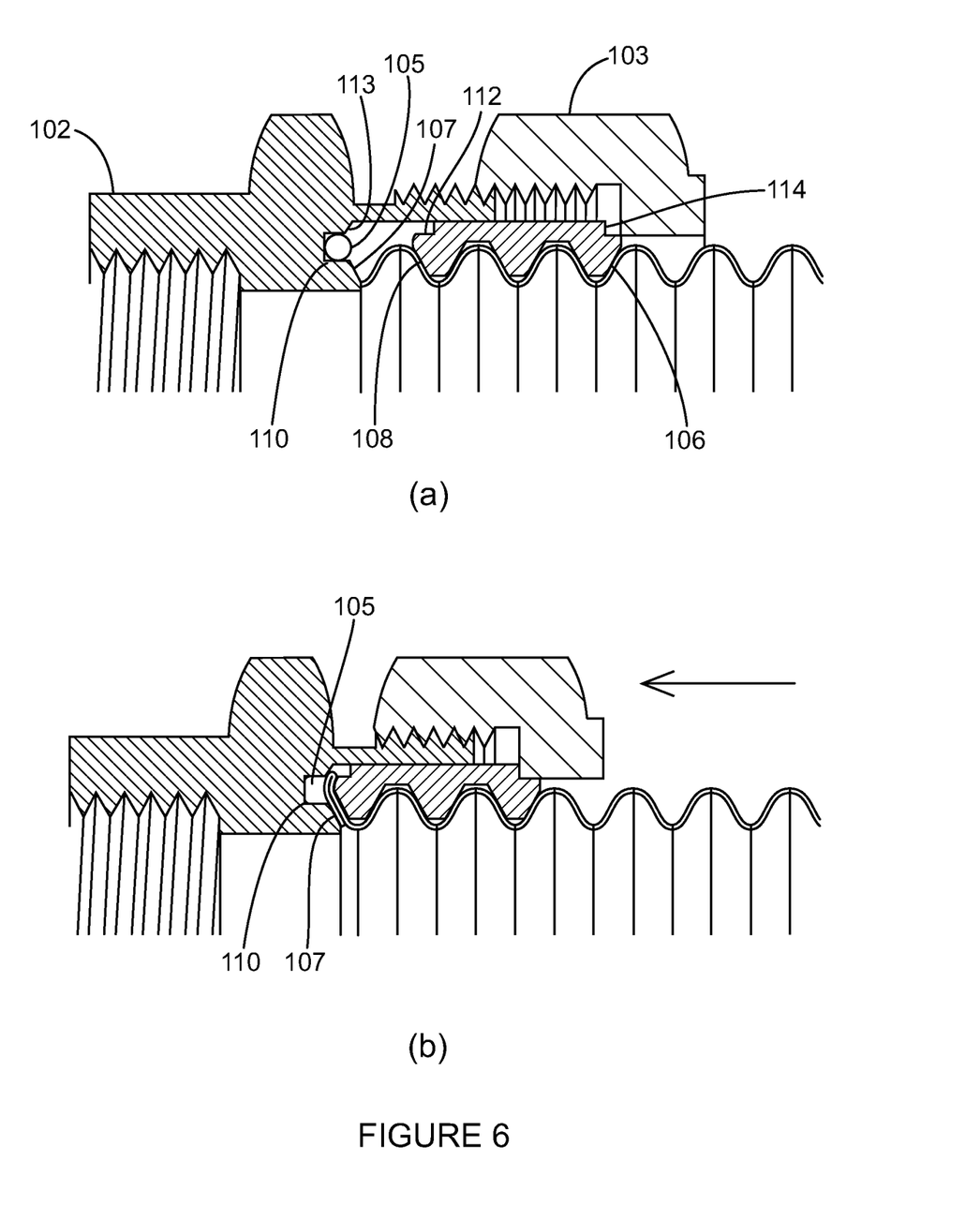
FIG. 6(a) is an enlarged view of a portion of FIG. 4(b)
FIG. 6(b) is an enlarged view of a portion of FIG. 5(b)

FIGS. 4, 5 and 6 illustrate a second embodiment of the invention. In this embodiment the collet 104 further includes a cut-out portion in both the proximal and distal end faces 112, 114. The cut-out portion on the distal end face 114 of the collet 104 creates an L-shaped annular groove or shoulder; the axial face of which, in use, engages the radially interior face of the flange 109 such that when the nut 103 is tightened (i.e. the nut 103 is rotated, causing it to move proximally) said flange 109 locates with the axial and longitudinal faces of the L-shaped groove or shoulder, thus preventing distal movement of the collet 104 and, in turn, the corrugated tubing 101, and urging said collet 104 and tubing 101 proximally, towards the clamping surface 107 of the connector fitting 102. A similar cut-out on the proximal end face 112 of the collet 104 means the collet 104 is reversible. As in the first embodiment, this enables the collet 104 to be placed on the tubing 101 either way round, therefore simplifying installation of the connector assembly 100. Furthermore, the cut-out, or L-shaped groove proximate to the cut end of the corrugated tubing 101 provides a void in the fitting 102 into which the tube 101 can extend when flaring. This, as in the first embodiment, reduces any bunching of the tubing 101 within the connector fitting 102 and enables the collet 104 to press evenly over the surface of the folded portion of the corrugated tubing 101 and against the clamping surface 107 which improves the integrity of the seal therebetween.

Figure 7:
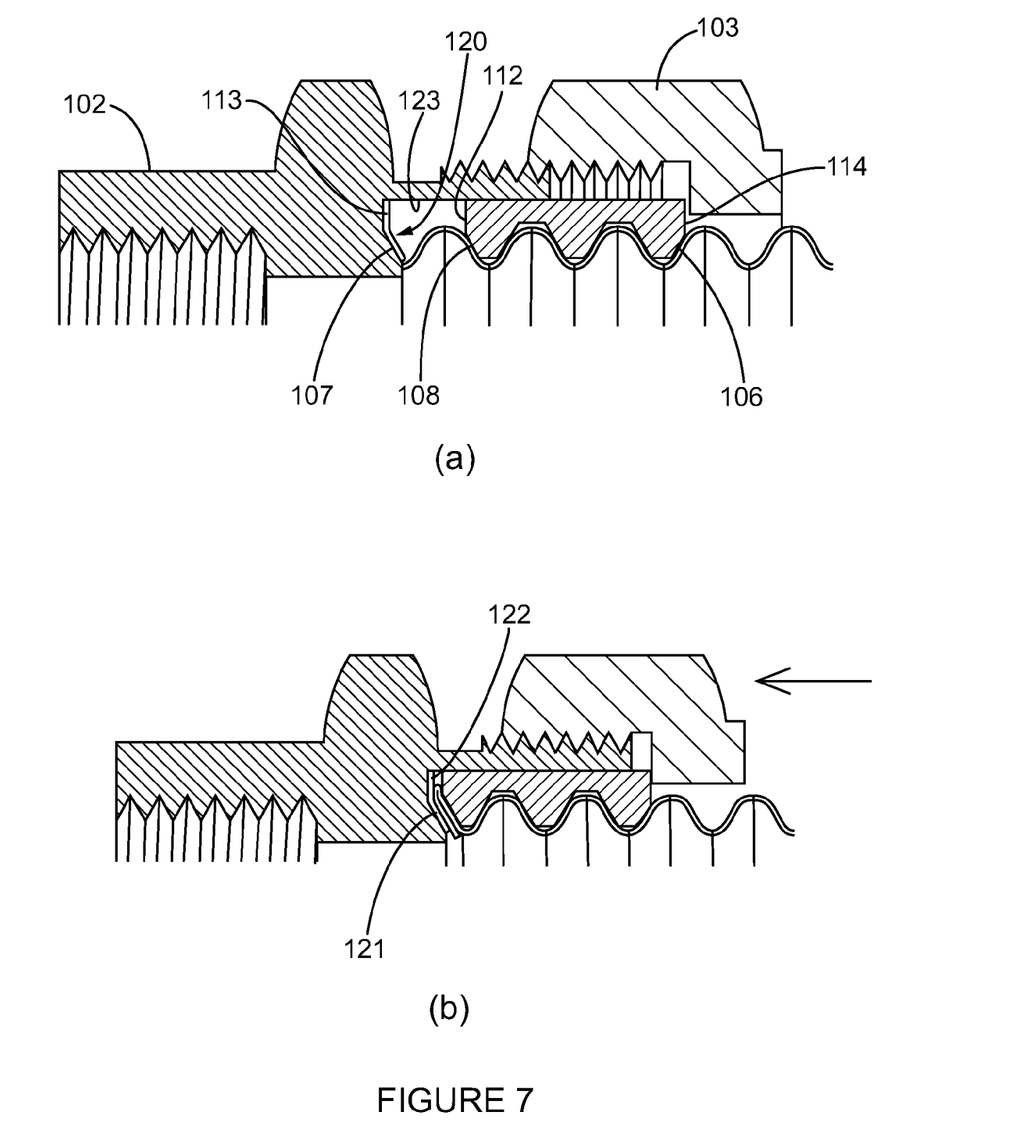
FIG. 7(a) is detailed view of a portion of the connector assembly according to a third embodiment of the present invention showing the nut in a first position.
FIG. 7(b) is a detailed view of a portion of the connector assembly according to a third embodiment of the present invention showing the nut in a second position.

FIG. 7 illustrates a third embodiment of the invention. In this embodiment the fitting 102 does not comprise an 0-ring 105 in a recess 110 located in the fitting end face 113, rather the tubing 101 is hermetically sealed against a copper gasket 120 provided on the clamping surface 107 and said fitting end face 113.

The gasket 120 is an annulus comprised of a frusto-conical portion 121 and a rim 122. The frusto-conical portion 121 is sized so as to engage with substantially all the tapered clamping surface 107 and the rim 122 extends radially outward from said frusto-conical portion 121 so as to engage with substantially all the fitting end face 113 of the fitting 102.

The gasket 120 is sized so as to be closely pressfittingly received by the tapered clamping surface 107 and end face 113. An interior face 123 of the fitting 102 extends from the radially outermost end of the fitting end face 113 and parallel to the longitudinal axis of the fitting 102 toward the tube 101, collet 104 and nut 103. The gasket 120 is removably held in place by virtue of its frictionally engaging close tolerance fit with the interior face 123.

The frictional engagement of the gasket 120 enables it to be held in position adjacent the clamping surface 107 and end face 113 without fastening the collet 104 proximate to the fitting 102, such as, for example, during assembly and transport, etc.

As shown in FIG. 7(*b*), fastening the collet 104 proximate to the fitting 102 also acts to secure said gasket 120 to the fitting 102.

As with the previous two embodiments, the clamping surface 107 tapers radially outward and is configured such that continued tightening of the nut 103 urges the cut end of the tubing 101 to collapse axially such that the cut end of the tubing folds concertina-like against an adjacent convolution of corrugated tubing 101 to form a folded portion as it is driven against the clamping surface 107 of the fitting 102. The tube end is subsequently positioned interiorly of said tube to create, as previously described, a double-walled flare. The flare is brought into engagement with the gasket 120 positioned on the clamping surface 107 and fitting end face 113 of the fitting 102 as the nut 103 is tightened to its fullest extent. A hermetic seal is formed as the flare is compressed against the gasket 120 by the proximal face 108 of the collet 104 which opposes the clamping surface 107 and fitting end face 113. The combination of the flared metal-to-metal connection allied with the gasket 120 creates a seal which is more reliable and durable than joins achieved by known corrugated tube connectors.

The gasket is made of copper. The malleable nature of copper further enables a hermetic seal between the corrugated tubing 101 and the fitting 102.

The present invention is not limited to the specific embodiments described above as it will be apparent to a reader skilled in the art that many forms of corrugated tubing connector assembly 100 could be formed that utilise a flared metal-to-metal connection in conjunction with an O-ring 105 or a gasket 120 and a reversible collet 104. Furthermore, it will be apparent that the connector 100 could be adapted for use with non-corrugated tubing as long as the collet 104 could engage with said tubing, for example, via the provision of a ridge or the like. The connector assembly 100 could be an end assembly, for example, to add rigidity to a hose end. Alternative arrangements and suitable materials will also be apparent to a reader skilled in the art.

The invention claimed is:

1. A connector assembly for a length of corrugated tubing, the connector assembly comprising:
    a fitting including a passage;
    a frusto-conical clamping surface;
    a seal at the frusto-conical clamping surface; and
    an axial loading element operably connectable to the fitting, the axial loading element including a collet engagable with at least one corrugation of a corrugated tube by which the corrugated tube is caused to move with the collet, wherein proximal and distal ends of the collet include a same frusto-conical profile matching the frusto-conical profile of the clamping surface, such that the collet can be oriented with either the proximal or distal end proximate to the clamping surface,
    wherein, a corrugated tube is in fluid communication with said passage of said fitting, axial movement of said axial loading element towards said clamping surface clamps said corrugated tube between said frusto-conical clamping surface and the frusto-conical profile of the collet as against said seal whereby said corrugated tube is thereby sealingly restrained to said fitting; and
    wherein the frusto-conical clamping surface is formed such that it causes an end portion of the corrugated tube to form a flare by said end portion being compressed against said frusto-conical clamping surface and against said seal and sealed thereagainst under the action of the axial loading element.

2. The connector according to claim 1, wherein said axial loading element further comprises a nut which engages the collet.

3. The connector according to claim 1, wherein axial movement of the loading element towards the clamping surface urges a corrugated tube towards the clamping surface.

4. The connector according to according to claim 1, wherein the clamping surface opposes an end face of the axial loading element and the end face matingly engages the clamping surface.

5. The connector according to according to claim 1, wherein the seal is positioned radially outwardly of the frusto-conical clamping surface.

6. The connector according to according to claim 1, wherein the seal is partially recessed relative to the frusto-conical clamping surface.

7. The connector according claim 1, wherein the seal comprises a frusto-conical surface which tapers radially outwardly to engage the clamping surface.

8. The connector according to claim 7, further comprising an end face which extends radially outwardly from the clamping surface and wherein the seal comprises a rim which extends radially outwardly to engage said end face.

9. The connector according to claim 8, wherein the seal overlies the clamping surface and end face.

10. The connector according to claim 1, wherein the collet includes at least one bevelled ridge which is matingly engagable with at least one corrugation of a corrugated tube.

11. The connector according to claim 10, wherein the at least one bevelled ridge opposes the frusto-conical clamping surface.

12. The connector according to claim 11, wherein the collet comprises three bevelled ridges.

13. The connector according to claim 10, wherein the said at least bevelled ridge has a pitch and profile substantially equal to the pitch and profile of the corrugations of a corrugated tube so as to, in use, matingly engage thereagainst.

14. The connector according to claim 1, wherein the collet further includes a shoulder at its proximal end which provides a void in the fitting into which a portion of a corrugated tube can extend when flaring.

15. The connector according to claim 1, wherein the proximal and distal end faces of the collet are perpendicular to the longitudinal axis of the fitting.

16. A method for securing a connector assembly to a corrugated tube, comprising the steps of:
- a) providing a connector assembly and a corrugated tube, the connector assembly comprising a fitting including a passage, a frusto-conical clamping surface, a seal, and an axial loading element,
- b) cutting said corrugated tube in a valley in the corrugated surface to form a cut end,
- c) placing said axial loading element over said corrugated tube,
- d) engaging said cut end of said corrugated tube with said clamping surface,
- e) operably connecting said axial loading element to said fitting, and
- f) applying a load to said axial loading element such that said corrugated tube is driven into contact with said frusto-conical clamping surface and said cut end is urged axially to create a flare which is compressed against said frusto-conical clamping surface and against said seal such that said corrugated tube is thereby sealingly restrained to said fitting.

17. A connector assembly for a length of corrugated tubing, the connector assembly comprising:
- a fitting including a passage;
- a frusto-conical clamping surface tapering radially outwardly and forming a shoulder against which a corrugated tube is abuttable;
- a seal at the frusto-conical clamping surface, including a frusto-conical surface tapering radially outwardly to engage the clamping surface; and
- an axial loading element operably connectable to the fitting,
- wherein the frusto-conical clamping surface opposes an end face of the axial loading element and the end face is matingly engagable with the clamping surface;
- wherein the proximal and distal ends of the collet have a same profile such that the collet can be oriented with either the proximal or distal end proximate to the clamping surface
- wherein, when a corrugated tube is in fluid communication with said passage of said fitting and wherein axial movement of said axial loading element towards said frusto-conical clamping surface urges said corrugated tube against said frusto-conical clamping surface and against said seal wherein said corrugated tube is thereby sealingly restrained to said fitting; and
- wherein the frusto-conical clamping surface is formed such that it causes an end portion of the corrugated tube to form a flare by said end portion being compressed against said frusto-conical clamping surface and against said seal and sealed thereagainst under the action of the axial loading element.

* * * * *